D. W. SOCOLOFSKY & D. G. BLEHM.
EXTENSION FEEDER AND SUPPORTING TRUCK.
APPLICATION FILED JUNE 29, 1915.
1,197,869.
Patented Sept. 12, 1916.
2 SHEETS—SHEET 1.
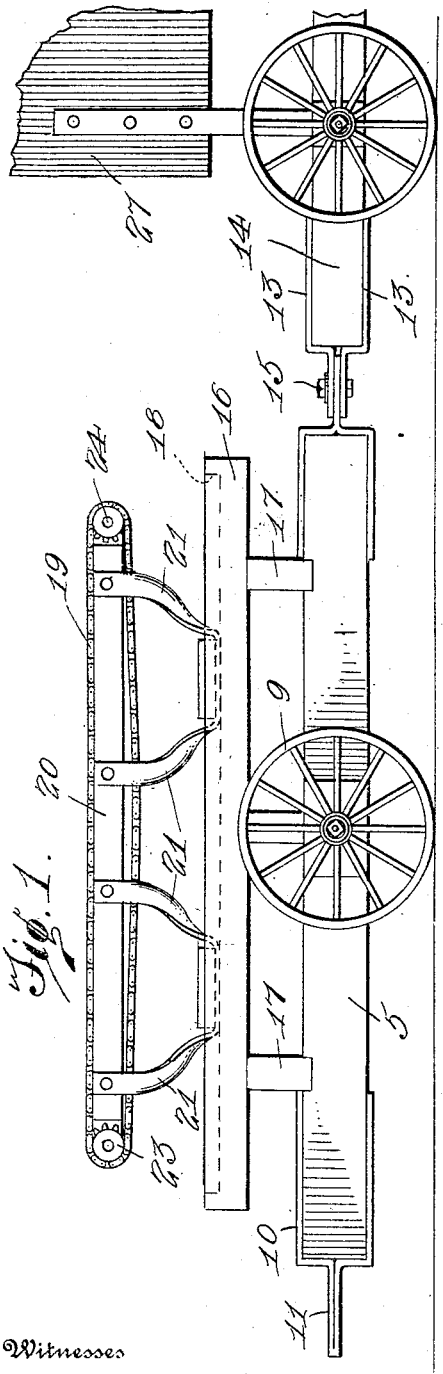
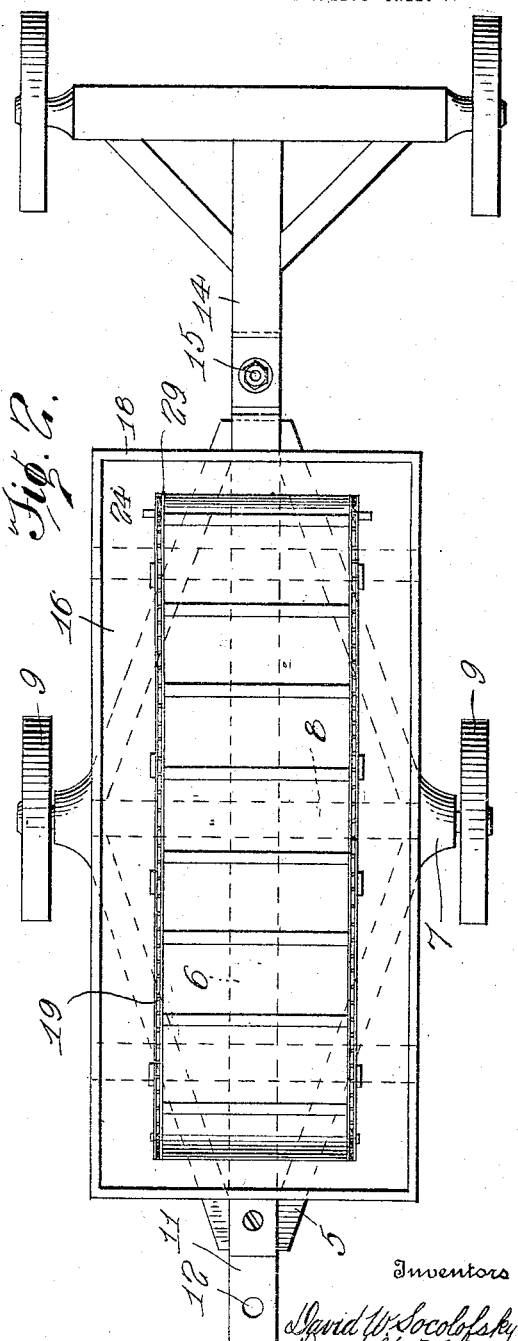

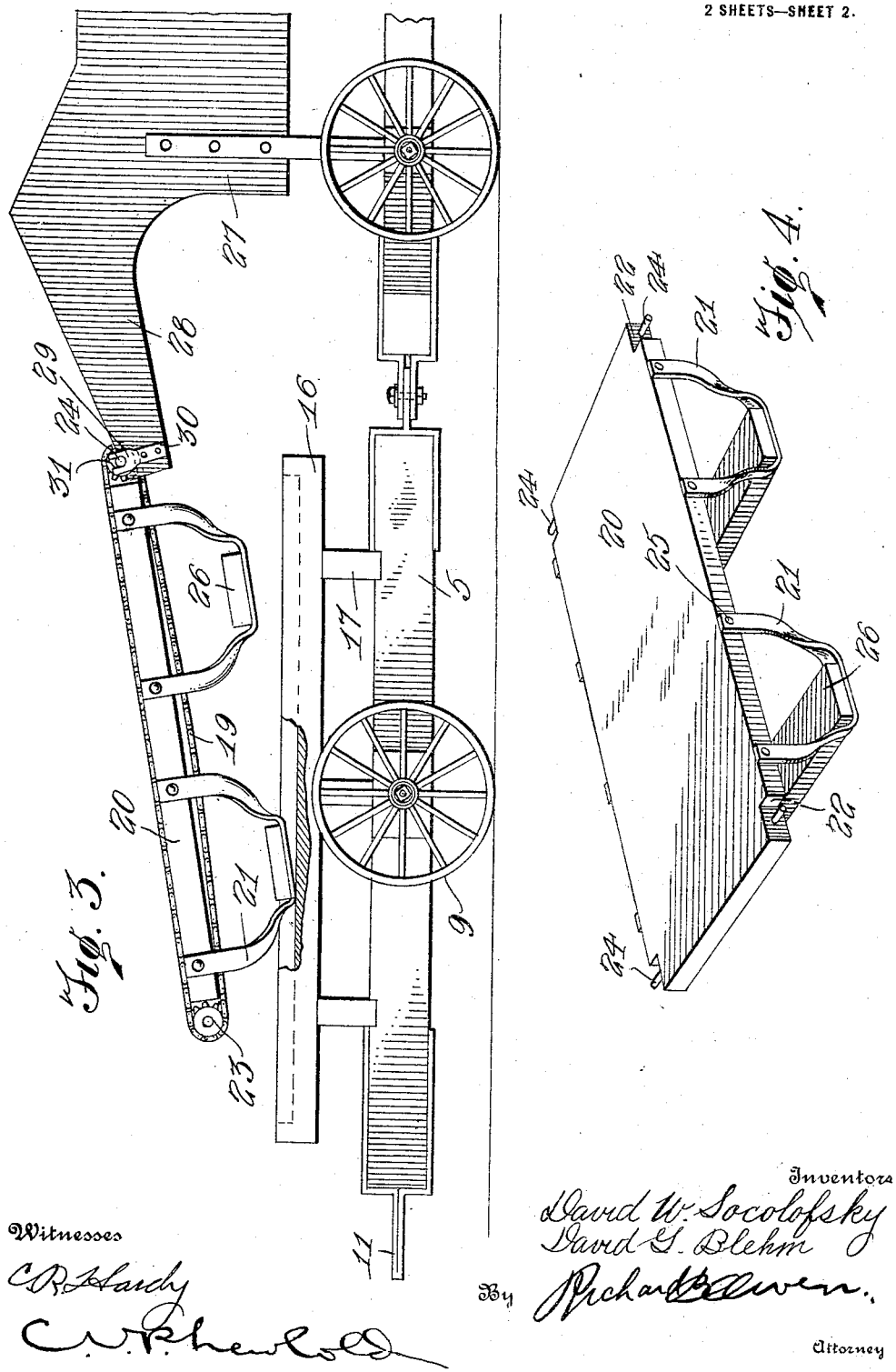

even, as illustrated in plan in Fig. 2, having the elongated extremities of the diamond connected
UNITED STATES PATENT OFFICE.

DAVID W. SOCOLOFSKY, OF WILSON, AND DAVID G. BLEHM, OF DORRANCE, KANSAS.

EXTENSION-FEEDER AND SUPPORTING-TRUCK.

1,197,869. Specification of Letters Patent. Patented Sept. 12, 1916.

Application filed June 29, 1915. Serial No. 37,092.

*To all whom it may concern:*

Be it known that we, DAVID W. SOCOLOFSKY and DAVID G. BLEHM, citizens of the United States, residing at Wilson and Dorrance, respectively, in the counties of Ellsworth and Russell and State of Kansas, have invented certain new and useful Improvements in Extension-Feeders and Supporting-Trucks, of which the following is a specification.

This invention relates to an auxiliary truck adapted to be used in conjunction with a grain separator to be employed in the usual manner for the separator while supported by the truck.

Specifically, it is the object of this invention to provide an extension feeder for a separator which will be readily removable from its operative association therewith and which is adapted to be supported either wholly or in part by an auxiliary truck which is coupled between the separator and the tractor for moving the latter.

An equally specific object is to provide a supporting truck and an extension feeder of a grain separator, such truck being provided with a grain saving platform and the feeder being equipped with supporting brackets serving to maintain the endless conveyer of the feeder in spaced relation to the platform.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is a side elevational view of the auxiliary truck of this invention as coupled to a grain separator and supporting the removable feeder also provided by this invention; Fig. 2 is a plan view of the same subject-matter as Fig. 1; Fig. 3 is a view somewhat similar to Fig. 1 but showing the feeder as operatively associated with the separator and supported by the truck, and Fig. 4 is a perspective view of the feeder platform *per se*.

Extension feeders have been employed for the purpose of facilitating the feeding of the grain from stacks on the ground to the threshing mechanism of the grain separator but their use being normally cumbersome there is proposed by this invention a removable feeder adapted to be wholly or partially supported by a truck which greatly facilitates its handling.

The supporting truck for the feeding mechanism includes a frame designated as an entirety by the numeral 5, the frame being preferably diamond-shaped as illustrated in plan in Fig. 2, having the elongated extremities of the diamond connected by the longitudinal draw bar 6 of the truck while the transverse extremities carry blocks 7 through which there projects an axle 8 serving to mount the wheels 9 of the truck. The projecting extremities of the draw bars 6 are fitted with a metallic strap 10, the extremities of which are secured in any desirable manner to both upper and lower surfaces of each draw bar end while the intermediate or bight portion is flattened in the manner denoted by the numeral 11 to inclose each end surface of the draw bar and to project forwardly therefrom. This flattened portion 11 is provided with a coupling aperture 12 in the case of each of the straps, since the truck of this invention is adapted to be coupled between the grain separator and the tractor engine furnishing the motive power for the separator. Similar straps 13 may be provided for the extremity of the draw bar 14 for the separator, the extremities of the straps being bent over the end of the draw bar, in spaced relation to each other so as to inclose the flattened end 11 of an adjacent coupling strap of the frame 5, bolt means 13 serving to swivelly connect the two vehicles. In a similar manner the tractor engine may be coupled to the opposite end of the truck which is thus always in a position to perform its function with respect to the grain separator.

Upon the truck frame 5 there is supported a platform 16, through the medium of the cross knees or bolsters 17. This platform is provided with a perimetral wall 18 of any desirable type and it is upon the platform that the extension feeder of this invention is adapted to be directly supported.

The extension feeder of this invention may be readily constructed from an extension feeder of any of the types now customarily employed to facilitate the feeding of grain to the separator. Each of these feeders includes usually a conveyer 19 and suitable means of support which in the present instance are supplemented by a platform 20 and supporting brackets 21. The platform 20 is of such size as to be accommodated between the upper and lower conveyer portions and has its extremities cut away at each corner in the rectangular manner denoted 22 for the purpose of receiving the sprocket wheels 23 of the conveyer. Trunnions 24 project into these cut out portions to mount the sprockets and the conveyer belt, provided with its usual slats may be then trained upon the sprockets in such manner as to cover the platform 20. The brackets 21 are each formed of a single piece of strap metal having its extremities secured to the platform 20 through the medium of means 25 while the intermediate portion is twisted at right angles into a horizontal plane for the support of foot boards 26 which connect each pair of opposite straps. The trunnions 24 are of sufficient length as to project beyond the sprocket wheel carried thereby in order to form a means of operatively associating the feeder to the separator.

The separator 27 is provided with the usual projecting casing 28 which houses the customary feeder to the beating or threshing mechanism and to the extremities of this projecting casing there is preferably secured a pair of stirrups 29 including the securing stem 30 and a bifurcated extremity 31 adapted to receive the prolonged extremities of a pair of the trunnions 24 to support the upper end of the feeder in the manner illustrated in Fig. 3.

In using the extension feeder and supporting truck of this invention the latter is coupled in the manner indicated between the tractor and the separator and the feeder is allowed to rest upon the platform 16 until ready for use at which time one extremity is raised and the trunnions 24 at that end seated within the stirrup members 29. The brackets 21 serve to support the feeder in spaced relation to the platform at all times so that no interference will be offered to the conveyer 19 when in operation. The platform 16 serves to catch all of the grain spilled from the feeder conveyer, which in ordinary circumstances is now wasted upon the ground while a decided advantage of the mechanism resides in the fact that the feeder need not be unhooked, from these stirrup members even when it is desired to move the grain separator from one set of stacks to another. If the vehicles are to be transported a considerable distance or around curves, the feeder should be disengaged from the stirrups and placed upon the platform in order to take advantage of the swiveling movement permitted by the coupling bolt 15.

All laborious handling of the feeder is obviated by the use of the particular extension feeder and supporting truck of this invention, in addition to the grain saving feature of the platform. Having the feeder supported upon a truck which may be connected to the tractor for drawing the separator also permits the latter to be quickly rescued in case of a fire starting in the standing stacks of grain. The ordinary form of extension feeder as now employed would materially obstruct the rescuing operation.

While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. In an implement of the class described, the combination with a truck centrally mounted on a pair of wheels to permit end tipping of the truck, a platform rigidly mounted on said truck, a wall surrounding the outer edge of said platform, an extension conveyer including an endless apron belt, supporting wheels therefor, and an intermediate platform supported on the truck platform, brackets depending from the platform of said conveyer and extending inwardly from the ends thereof to permit ready elevation of either of said ends, and laterally projecting trunnions at the ends of the conveyer platform to form bearings for the conveyer apron wheels and supports for the ends of the conveyer when elevated.

2. In an implement of the class described, the combination with a wheeled truck having a walled platform thereon, of an extension conveyer including an endless apron belt, sprocket wheels for supporting said belt, and an intermediate platform within said belt, brackets depending from said platform on opposite sides and at each end for sustaining the conveyer upon the wheeled platform, said depending brackets being inclined or extended inwardly from the ends to permit ready elevation of either of said ends when desired, laterally projecting trunnions at the ends of the conveyer platform to form bearings for said sprocket wheels and to support the end of the conveyer when elevated, and transverse connecting strips between said brackets.

3. In an implement of the class described, an extension conveyer comprising a horizontal rectangular platform having a cut-out portion at each corner and a trunnion projecting laterally from each cut-out portion, a U-shaped bracket depending from each end of said platform and on each side thereof, said brackets being inclined toward each other on each side of said platform, and a connecting strip between the brackets of each side.

In testimony whereof we affix our signatures in presence of two witnesses.

DAVID W. SOCOLOFSKY.
DAVID G. BLEHM.

Witnesses:
CARL H. ANSCHUTZ,
ERNEST E. ANSCHUTZ.

Copies of this patent may be obtained for five cents each, by addressing the "Commissioner of Patents, Washington, D. C."